(12) United States Patent
Zhang

(10) Patent No.: US 11,345,311 B2
(45) Date of Patent: May 31, 2022

(54) ELECTRIC VEHICLE

(71) Applicant: BEIJING ZHIXING MUYUAN TECHNOLOGY CO., LTD., Beijing (CN)

(72) Inventor: Shengqiao Zhang, Beijing (CN)

(73) Assignee: NINE INTELLIGENT (CHANGZHOU) TECH CO., LTD., Changzhou (CN)

( * ) Notice: Subject to any disclaimer, the term of this patent is extended or adjusted under 35 U.S.C. 154(b) by 0 days.

(21) Appl. No.: 16/626,338

(22) PCT Filed: May 10, 2019

(86) PCT No.: PCT/CN2019/086409
§ 371 (c)(1),
(2) Date: Dec. 24, 2019

(87) PCT Pub. No.: WO2020/143143
PCT Pub. Date: Jul. 16, 2020

(65) Prior Publication Data
US 2021/0331645 A1  Oct. 28, 2021

(30) Foreign Application Priority Data
Jan. 7, 2019 (CN) .................. 201920017080.X

(51) Int. Cl.
*B60R 25/20* (2013.01)
*B60R 25/24* (2013.01)
(Continued)

(52) U.S. Cl.
CPC .......... *B60R 25/20* (2013.01); *B60R 25/2018* (2013.01); *B60R 25/24* (2013.01);
(Continued)

(58) Field of Classification Search
CPC ............ B60R 2325/00; B60R 2325/10; B60R 2325/101; B60R 2325/103;
(Continued)

(56) References Cited

U.S. PATENT DOCUMENTS 5,523,746 A * 6/1996 Gallagher .......... G07C 9/00182
340/10.1
2006/0076834 A1 4/2006 Kamiya
(Continued)

FOREIGN PATENT DOCUMENTS

CN 203222059 A 10/2013
CN 206813156 A 12/2017
(Continued)

OTHER PUBLICATIONS

NPL_search (Sep. 2, 2021).*
(Continued)

*Primary Examiner* — Van T Trieu
(74) *Attorney, Agent, or Firm* — Gang Yu

(57) ABSTRACT

Provided is an electric vehicle. The electric vehicle includes: a first power source, a target component and an electrical control component integrated to the target component; the first power source is connected with the electrical control component and is configured to supply the power to the electrical control component; and the electrical control component is configured to unlock, under a condition in which the electric vehicle is locked, when target information matched with a stored target account number is detected, the electric vehicle. With the disclosure, the problems of complex structural design and troublesome unlocking operation of the electric vehicle in the related art are solved.

18 Claims, 3 Drawing Sheets

(51) Int. Cl.
  *B60R 25/25* (2013.01)
  *B62H 5/00* (2006.01)
  *B62J 45/40* (2020.01)

(52) U.S. Cl.
  CPC ............ *B60R 25/257* (2013.01); *B62H 5/00* (2013.01); *B60R 25/252* (2013.01); *B62J 45/40* (2020.02)

(58) Field of Classification Search
  CPC .......... B60R 2325/30; B60R 2325/306; B60R 25/20; B60R 25/2018; B60R 25/2036; B60R 25/209; B62R 25/24; B62K 23/02; B62K 3/06; B62K 25/08; B62M 9/122; B62H 5/08; B62H 5/20
  See application file for complete search history.

(56) References Cited

U.S. PATENT DOCUMENTS

| | | | |
|---|---|---|---|
| 2009/0199292 A1* | 8/2009 | Sakamoto | B60R 25/24 726/17 |
| 2014/0000322 A1 | 1/2014 | Williams | |
| 2015/0091698 A1* | 4/2015 | Du | B60R 25/2036 340/5.72 |
| 2016/0340940 A1 | 11/2016 | Krishnan | |
| 2018/0257736 A1* | 9/2018 | Komatsu | B62M 25/08 |
| 2018/0297656 A1* | 10/2018 | Mai | B62H 5/001 |
| 2019/0210682 A1* | 7/2019 | Palchaudhuri | B62H 5/00 |
| 2019/0248325 A1* | 8/2019 | Schmidt | B60R 25/1003 |
| 2021/0403110 A1* | 12/2021 | Zhang | B62H 5/08 |

FOREIGN PATENT DOCUMENTS

| | | |
|---|---|---|
| CN | 207473704 X | 6/2018 |
| CN | 108346201 Y | 7/2018 |
| CN | 207607573 A | 7/2018 |
| CN | 109625149 A | 4/2019 |
| EP | 1188659 A | 3/2002 |
| JP | H10196188 A | 7/1998 |
| JP | 2004122816 A | 4/2004 |
| JP | 2006514348 A | 4/2006 |
| JP | 2006316601 A | 11/2006 |
| JP | 2008260399 A | 10/2008 |
| JP | 2009174294 A | 8/2009 |
| JP | 2011106166 A | 6/2011 |
| KR | 20110027184 A | 3/2011 |
| WO | 2011120124 A | 10/2011 |
| WO | 2018056819 A | 3/2018 |

OTHER PUBLICATIONS

EP Search Report dated Aug. 11, 2020.
KR Search Report dated May 19, 2020.
JP Search Report dated Jun. 1, 2021.
Corresponding JP application search results dated Oct. 12, 2021.
Corresponding EP application search results dated Dec. 20, 2021.

* cited by examiner

ELECTRIC VEHICLE

TECHNICAL FIELD

The disclosure relates to the field of communication, and in particular to an electric vehicle.

BACKGROUND

An electronic door lock switch in an electrical control system of a conventional electric vehicle is a module having a mechanical structure and a space needs to be reserved for it, so that the electrical control system of the electric vehicle is complex. Moreover, the electronic door lock switch needs a key to control locking and unlocking of the vehicle, resulting in that the operation of the electronic door lock switch is complex.

Therefore, the electric vehicle has the problems of complex structural design and troublesome unlocking operation in the related art.

SUMMARY

The embodiment of the disclosure provides an electric vehicle to at least solve the problem of complex structural design and troublesome unlocking operation in the related art.

According to an embodiment of the disclosure, an electric vehicle is provided, and the electric vehicle may include: a first power source, a target component and an electrical control component integrated to the target component; the first power source is connected with the electrical control component and is configured to supply the power to the electrical control component; and the electrical control component is configured to unlock, under a condition in which the electric vehicle is locked, when target information matched with a stored target account number is detected, the electric vehicle.

Preferably, the electric vehicle may further include: a second power source, a motor and a switch circuit; and the electrical control component is connected with the switch circuit, and is specifically configured to connect, when the target information matched with the stored target account number is detected, a power supply circuit powered by the second power source for the motor, by using the switch circuit to unlock the electric vehicle.

Preferably, the electrical control component includes a first wireless communication module; and the first wireless communication module is configured to receive input information sent by a target device having a second wireless communication module via the second wireless communication module, wherein the input information carries account number information of a reference account number bound to the second wireless communication module; and connect, under a condition of determining that the account number information is the target information, the power supply circuit by using the switch circuit.

Preferably, the first wireless communication module includes at least one of the following: a Bluetooth, a Near Field Communication (NFC) module, a public Key Encription (PKE) module, a Wireless Fidelity (wi-fi) module, a ZigBee module, an Ultra Wide Band (UWB) module and a 433M wireless ad hoc network module.

Preferably, the electrical control component includes a detection module and a control module; the detection module is configured to detect biological characteristic information within a predetermined detection area; and the control module is connected with the detection module, and is configured to connect, under the condition of determining that the biological characteristic information is the target information, the power supply circuit by using the switch circuit.

Preferably, the detection module includes at least one of the following: a fingerprint detection module configured to detect a fingerprint, a face detection module configured to detect a face, and a sound detection module configured to detect a sound.

Preferably, the switch circuit includes a triode; the triode includes a base, a collector and an emitter; and the base is connected with the electrical control component, and is configured to connect the power supply circuit by adjusting a current between the collector and the emitter under the control of the electrical control component.

Preferably, the switch circuit includes a field-effect transistor; the field-effect transistor includes a source, a grid and a drain; and the grid is connected with the electrical control component, and is configured to connect the power supply circuit by adjusting a current between the source and the drain under the control of the electrical control component.

Preferably, the switch circuit includes an electromagnetic relay; the electromagnetic relay includes a trigger pin, a common end and a normally open end; and the trigger pin is connected with the electrical control component, and is configured to connect the power supply circuit by adjusting a current between the common end and the normally open end under the control of the electrical control component.

Preferably, the electrical control component is further configured to lock, upon the detection of time that the electric vehicle is continuously in unlocked and motor control shielded states, a wheel speed is zero and a kickstand is in a placed-down state exceeding a target time threshold, the electric vehicle.

Preferably, the electrical control component is further configured to unlock, under a condition in which the electric vehicle is in locked and kickstand folded state, upon the detection of the target information matched with the stored target account number, the electric vehicle.

Preferably, the target component is one of the following: an instrument panel, an accelerator shifter, a saddle, a seat cask, a combined switch, a rear view mirror, a front-rear lamp and the kickstand.

In the above embodiments, the electrical control component is integrated to the target component of the electric vehicle, and under the condition in which the electric vehicle is in the locked and kickstand folded states, upon the detection of the target information matched with the stored target account number, the electric vehicle is unlocked by the electrical control component. Since the electrical control component is used to replace the electronic door lock switch to execute the unlocking operation of the electric vehicle, the unlocking steps of the electric vehicle may be simplified, the structural space of the electric vehicle is saved and the cost may be effectively reduced; and the problems of complex structural design and troublesome unlocking operation of the electric vehicle in the elated art are solved.

BRIEF DESCRIPTION OF THE DRAWINGS

The accompanying drawings are described here to provide a further understanding of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and embodiments in detail. It should be noted that the embodiments of the disclosure and the characteristics of the embodiments may be combined with each other if there is no conflict.

It is to be noted that, terminologies such as "first" and "second" in the specification, claims and accompanying drawings of the disclosure are only used to distinguish similar objects, rather than to describe a special order or a precedence order.

Embodiment 1

Figure 1:
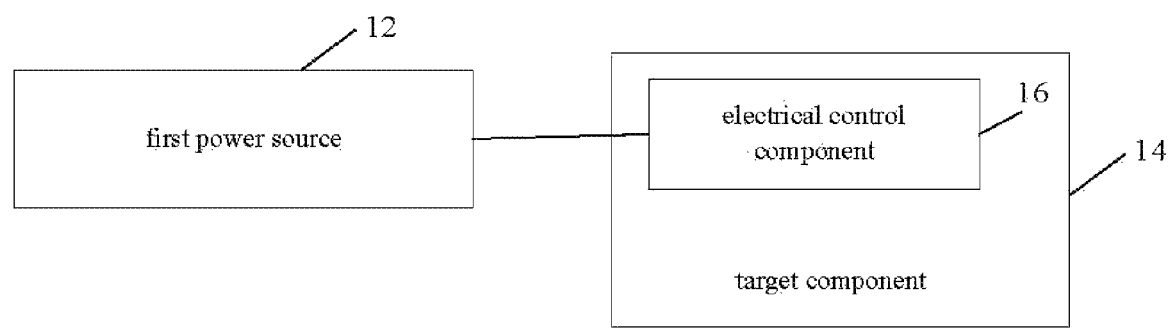
FIG. 1 is a structural block diagram of an electric vehicle according to an embodiment of the disclosure.

The embodiment of the disclosure provides an electric vehicle. FIG. 1 is a structural block diagram of an electric vehicle according to an embodiment of the disclosure. As shown in FIG. 1, the electric vehicle may include: a first power source 12, a target component 14, and an electrical control component 16 integrated to the target component.

The first power source 12 is connected with the electrical control component 16, and is configured to supply the power to the electrical control component 16.

The electrical control component 16 is configured to unlock, under a condition in which the electric vehicle is locked, upon the detection of target information matched with a stored target account number, the electric vehicle.

In the embodiments of the present disclosure, the electrical control component is integrated to the target component of the electric vehicle, and under the condition in which the electric vehicle is locked (or the locked and kickstand folded states), upon the detection of the target information matched with the stored target account number, the electric vehicle is unlocked by the electrical control component. The problems of complex structural design and troublesome unlocking operation of the electric vehicle in the elated art are solved, the unlocking steps of the electric vehicle are simplified, the structural space of the electric vehicle is saved and the cost may be effectively reduced.

Two states are provided for a kickstand of the electric vehicle, including a folded state and a placed-down state. The folded state refers to a state in which the kickstand of the electric vehicle takes no effect (i.e., a state in which the kickstand of the electric vehicle does not support the electric vehicle). The placed-down state refers to a state in which the kickstand of the electric vehicle takes the effect (i.e., a state in which the kickstand of the electric vehicle supports the electric vehicle). The kickstand of the electric vehicle may be a single-sided kickstand, and may also be a double-sided kickstand.

Optionally, under the condition in which the electric vehicle is locked, the electric vehicle cannot be used by the rider. If the electric vehicle is used, the electric vehicle needs to be unlocked. The locked state refers to that the power supply circuit powered by the power source of the electric vehicle for the motor is disconnected. The unlocking state refers to that the power supply circuit powered by the power source of the electric vehicle for the motor is connected.

Generally, the electric vehicle is provided with an anti-theft alarm (also referred to as alarm) having an anti-theft alarm function (or, alarm function). The anti-theft alarm may be powered by the first power source, and may also be powered by using other power sources different from the first power source. The anti-theft alarm function of the anti-theft alarm may be controlled by a remote controller to open (or referred to as activate) or close. A sensor is built in the anti-theft alarm. The activated anti-theft alarm may detect, via the built-in sensor, an alarm sound when the electric vehicle is collided to implement the anti-theft alarm function.

Before the electric vehicle is unlocked, the anti-theft alarm of the electric vehicle may be closed. The anti-theft alarm of the electric vehicle is configured to receive, before the electric vehicle is unlocked, a control signal sent by the remote controller and used for controlling to close the anti-theft alarm function of the anti-theft alarm; and close, in response to the control signal, the anti-theft alarm function.

The electric vehicle may include an electronic door lock switch; and the unlocking of the electric vehicle may be implemented by inserting into a mechanical key of the electronic door lock switch of the electric vehicle and rotating to open the electronic door lock switch.

In this embodiment of the disclosure, in order to simplify the unlocking operation process of the electric vehicle and save the system space of the electric vehicle, the electrical control component may be used to replace the electronic door lock switch, and the electrical component is integrated to the target component of the electric vehicle and is powered by the first power source. Under the condition in which the electric vehicle is locked, the electric vehicle may be in a low power consumption state, the electrical control component is powered by the first power source and the anti-theft alarm also works normally. The target information matched with the target account number may be stored in the electrical control component. The electrical control component may be configured to unlock the electric vehicle upon the detection of the target information matched with the stored target account number.

Preferably, the first power supply may be a battery having a small output voltage or a group of batteries having small output voltages, such as a 5 # battery, a button battery and a 18650 type charging battery.

Preferably, the electrical control component may further be configured to control the anti-theft alarm to open and close. For example, when the target information matched with the target account number is detected, the electrical control component controls to close the anti-theft alarm.

With the above technical solutions in this embodiment of the disclosure, the rider does not need to operate the remote controller to close the anti-theft alarm, thus simplifying the operation steps.

The target component integrated with the electrical control component may be a component at any position of the electric vehicle, such as an instrument panel, an accelerator shifter, a saddle, a seat barrel, a combined switch, a rear view mirror, a front-rear lamp and a kickstand. Preferably, in order to facilitate the operation of the user, the target component may be the instrument panel of the electric vehicle.

In this embodiment of the disclosure, the electric vehicle may further include: a second power source, a motor and a switch circuit; and the electrical control component is connected with the switch circuit, and is specifically configured to connect, when the target information matched with the stored target account number is detected, a power supply circuit powered by the second power source for the motor, by using the switch circuit to unlock the electric vehicle.

The electrical control component may include different hardware modules, and may implement the detection of the target information via the different hardware modules or a combination of the different hardware modules.

As an optional implementation manner, the electrical control component may include a first wireless communication module; and the first wireless communication module is configured to receive input information sent by a target device having a second wireless communication module via the second wireless communication module, wherein the input information carries account number information of a reference account number bound to the second wireless communication module, and under a condition of determining that the account number information is the target information, the power supply circuit is connected by using the switch circuit.

The first wireless communication module and the second wireless communication module may interact via a wireless communication manner that may include but not limited to at least one of the following: an NFC module, a Bluetooth, a PKE module, a wi-fi module, a ZigBee module, an UWB module and a 433M wireless ad hoc network module, etc.

For example, the electrical control component may include the NFC module, and a card (physical card or virtual card) matched with the NFC module may be provided for the user together when the electric vehicle is purchased. The user may add the information (e.g., card number information for uniquely identifying the user card) of the card on a mobile device (e.g., a mobile phone) having an NFC function. In this way, the electric vehicle may be unlocked by the user by using the mobile device.

Upon the reception of a wireless signal sent by the NFC module on the mobile device, the NFC module on the electric vehicle may judge whether the card number information carried in the wireless signal is matched with the NFC module or not. Under a condition in which the card number information carried in the wireless signal is matched with the NFC module, the electric vehicle is controlled to be unlocked.

For example, the electrical control component may be the Bluetooth. The user may pair a mobile device (e.g., a mobile phone) having a Bluetooth with the Bluetooth on the electric vehicle. After successful pairing, the user may unlock the electric vehicle in a manner of connecting the two paired Blueteeths.

Upon the reception of a wireless signal sent by the Bluetooth on the mobile device, the Bluetooth on the electric vehicle may judge whether the device information carried in the wireless signal is matched with the device information of the Bluetooth or not. Under a condition in which the device information carried in the wireless signal is matched with the device information of the Bluetooth, the electric vehicle is controlled to be unlocked.

Other wireless communication modules (e.g., the PKE module, wi-fi module, ZigBee module, UWB module and 433M wireless ad hoc network module) are similar to the NFC module or the Bluetooth in unlocking manner, which will not be repeated herein.

As another optional implementation manner, the electrical control component may include a detection module and a control module; the detection module is configured to detect biological characteristic information within a predetermined detection area; and the control module is connected with the detection module, and is configured to connect, under the condition of determining that the biological characteristic information is the target information, the power supply circuit by using the switch circuit.

The biological characteristic information may include at least one of the following: a fingerprint, a face, a sound and the like. The detection module may include at least one of the following: a fingerprint detection module (including a touch area) for detecting the fingerprint, a face detection module (including a camera) for detecting the face, and a sound detection module (including a microphone) for detecting the sound.

For example, the fingerprint, face and/or sound may be input by using the detection module and are stored in the electric vehicle. The sound may be a special segment of voice, e.g., "unlock the electric vehicle", and whether the target information is detected or not may be judged by detecting characteristics (e.g., tone) for distinguishing different sounds and the said contents.

With the technical solutions in this embodiment of the disclosure, the mechanical key is replaced by a manner of acquiring target characteristics via the wireless communication module or detection module integrated to the target component to unlock the electric vehicle and the rider does not need to carry the mechanical key, so the operation experience of the user is improved. Meanwhile, as the electronic door lock switch does not need to be installed, the electric vehicle no longer needs to reserve a space for the electronic door lock switch, and the structural briefness of the electric vehicle is improved.

The switch circuit may be connected (directly connected or indirectly connected) to the electrical control component. Upon the detection of the target information matched with the stored target account number, the electrical control component may generate a control signal (such as a high level signal) and enables the control signal to act on the switch circuit of the electric vehicle, so as to connect the power supply circuit powered by the power supply of the electric vehicle for the motor by using the switch circuit to unlock the electric vehicle.

The switch circuit may include: a triode (such as a switch triode), a field-effect transistor or an electromagnetic relay. By providing a control signal for a base of the triode, a grid of the field-effect transistor or a contact pin of the electromagnetic relay, the current between a collector and an emitter of the triode, the current between a source and a drain of the field-effect transistor, the current between a source and a drain of the field-effect transistor or the current between a common end and a normally open end of the electromagnetic relay are controlled to connect the power supply circuit.

Preferably, the switch circuit includes a triode, wherein a base of the triode is connected with the electrical control component, and is configured to connect the power supply circuit by adjusting a current between a collector and an emitter of the triode under the control of the electrical control component.

Preferably, the switch circuit includes a field-effect transistor, wherein a grid of the field-effect transistor is connected with the electrical control component, and is configured to connect the power supply circuit by adjusting a current between a source and a drain of the field-effect transistor under the control of the electrical control component.

Preferably, the switch circuit includes an electromagnetic relay, wherein a contact pin of the electromagnetic relay is connected with the electrical control component, and is configured to connect the power supply circuit by adjusting a current between a common end and a normally open end of the electromagnetic relay under the control of the electrical control component.

With the above technical solutions in this embodiment of the disclosure, the power supply circuit powered by the power supply of the electric vehicle for the motor is connected by using the switch circuit, so the implementation solutions are simple, and the production cost of the electric vehicle may be saved.

In this embodiment of the disclosure, the electric vehicle may further include: a target sensor and a controller (such as a Central Processing Unit (CPU) chip installed at a predetermined position of the electric vehicle. The target sensor may be configured to detect first predetermined information and send the first predetermined information to the controller, wherein the first predetermined information is used for indicating that the rider is located on the electric vehicle. The controller is configured to receive the first predetermined information, and control, under a condition in which the electric vehicle is in unlocked and motor control shielded states, in response to the first predetermined information, the electric vehicle to convert from the motor control shielded state into a motor control unshielded state.

The target sensor may be configured to detect a specific type of target information, and transmit the target information to the controller, so that the controller judges whether the target information is the first predetermined information or not.

Preferably, the rider is located on the electric vehicle, which may be represented by a parameter obviously changed after the rider sits on the electric vehicle, such as a pressure, an image and a barometric pressure. The target sensor includes at least one of the following: a pressure sensor, an infrared sensor and a barometric pressure sensor.

Preferably, the first predetermined information is used for indicating that a bearing state at the predetermined position is a predetermined state, wherein the predetermined state is at least one of the following: the pressure at the predetermined position is greater than or equal to a first target threshold, the image at the predetermined position includes a target image, and the barometric pressure at the predetermined position is greater than or equal to a second target threshold.

Preferably, the predetermined position includes at least one of the following: a position below a seat cushion of the electric vehicle, a position on a pedal of the electric vehicle, a position on each of shifters at two sides of a handlebar of the electric vehicle, a vehicle body portion in front of the seat cushion of the electric vehicle, a position on a tire of the electric vehicle, a position in the electric vehicle, and a position in a shock absorber of the electric vehicle.

The predetermined state may include at least one of the following: a press-down pressure of the seat cushion of the electric vehicle is greater than or equal to a target pressure value; a pedaling frequency of the pedal of the electric vehicle is greater than or equal to a target frequency; a middle area of the image includes an image of a person; and a pressure value of the tire of the electric vehicle is greater than or equal to a target pressure value.

For example, after the rider sits on the electric vehicle, the pressure on the saddle of the electric vehicle is increased and a pressure sensor is disposed below the saddle. When the pressure sensor detects that the press-down pressure acted on the seat cushion is greater than or equal to the target pressure value, it may be determined that the rider is on the electric vehicle.

Also for example, after the rider sits on the electric vehicle, when the infrared sensor on the electric vehicle detects that the middle area of the predetermined detection area (detection area of the infrared sensor, including an area above the saddle) includes the image of the person, it may be determined that the rider is on the electric vehicle.

The motor control shielded state refers to that a motor control signal generated via the speed control component (such as the accelerator shifter) and used for controlling the motor is shielded (the motor cannot be controlled via the speed control component). At this moment, although the controller of the electric vehicle may receive the motor control signal (e.g., by operating the motor control signal generated by the speed control component), the motor control signal is shielded. Therefore, the rotation of the motor cannot be controlled by operating the speed control component.

The motor control unshielded state refers to that the motor control signal generated via the speed control component (such as the accelerator shifter) and used for controlling the motor is unshielded (the motor may be controlled via the speed control component). At this moment, the control module of the electric vehicle may receive the motor control signal (e.g., by operating the motor control signal generated by the speed control component) and controls a rotational speed of the motor according to the motor control signal.

With the above technical solutions in this embodiment of the disclosure, under the condition in which the electric vehicle is in the unlocked and motor control shielded states, upon the detection of the first predetermined information, it is determined that the rider is located on the electric vehicle and the electric vehicle is converted from the motor control shielded state. The activation of the accelerator shifter is implemented without a user operation, the operation process is simplified, the user experience is smooth and the user experience is improved.

Preferably, the controller of the electric vehicle may be configured to receive a predetermined control signal (motor control signal) generated by operating a speed control component (e.g., by rotating the accelerator shifter of the electric vehicle) in the motor control unshielded state.

Upon the reception of the predetermined control signal, the controller of the electric vehicle may determine the rotational speed of the motor corresponding to the predetermined control signal. For example, the predetermined control signal may be generated by the number of turns (⅓ turn, ½ turn) at which the accelerator shifter is rotated. The greater the number of the rotated turns, the larger the rotational speed of the motor corresponding to the predetermined control signal.

With the above technical solutions in this embodiment of the disclosure, by virtue of the predetermined control signal generated by the accelerator shifter, the method is simple and quick, and the operation habit of the user is met.

In this embodiment of the disclosure, when the electric vehicle is in the unlocked and motor control unshielded states, second predetermined information may be detected, wherein the second predetermined information is used for indicating that the rider leaves away from the electric vehicle; and the electric vehicle is controlled to switch from the motor control unshielded state to the motor control shielded state.

The target sensor installed at the predetermined position of the electric vehicle may further be configured to detect the second predetermined information when the electric vehicle is in the unlocked and motor control unshielded states.

Herein, the predetermined position and the target sensor are similar to the above, and will not be repeated herein.

The second predetermined signal is used for indicating that the rider leaves away from the electric vehicle. The rider leaves away from the electric vehicle, which may be represented by detecting a parameter obviously changed after the rider leaves away from the electric vehicle.

Preferably, the second predetermined information is used for indicating that a bearing state at the predetermined position is a non-predetermined state, and the predetermined state is similar to the above and will not be repeated herein.

The non-predetermined state may include at least one of the following: a press-down pressure of the seat cushion of the electric vehicle is smaller than a target pressure value; a pedaling frequency of the pedal of the electric vehicle is smaller than a target frequency; a middle area of the image excludes an image of a person; and a pressure value of the tire of the electric vehicle is smaller than a target pressure value.

For example, after the rider leaves away from the electric vehicle, the pressure on the saddle of the electric vehicle is decreased and a pressure sensor is disposed below the saddle. When the pressure sensor detects that the press-down pressure acted on the seat cushion is smaller than the target pressure value, it may be determined that the rider leaves away from the electric vehicle.

Also for example, after the rider leaves away from the electric vehicle, when the infrared sensor on the electric vehicle does not detect the image of the person in the predetermined detection area (detection area of the infrared sensor, including an area above the saddle), it may be determined that the rider leaves away from the electric vehicle.

With the above technical solutions in this embodiment of the disclosure, when the rider leaves away from the electric vehicle, the speed control component is locked automatically, so that pressing the P-gear button to lock the speed control component turns out to be unnecessary and the control steps of the electric vehicle are simplified.

In this embodiment of the disclosure, after the electric vehicle is controlled to switch from the motor control unshielded state to the motor control shielded state, under a condition in which the time that the electric vehicle is continuously in the unlocked and motor control shielded states, a wheel speed is zero and a kickstand is in a placed-down state exceeds a target time threshold, the electric vehicle is locked.

When the electric vehicle is continuously in the unlocked and motor control shielded states, and the wheel speed is zero, the electric vehicle may be locked in a manner of rotating the electronic door lock switch with the mechanical key.

In order to simplify the locking operation process of the electric vehicle, under a condition in which the time that the electric vehicle is continuously in the unlocked and motor control shielded states, the wheel speed is zero and the kickstand is in the placed-down state exceeds the target time threshold (such as 3 s and 5 s), the electric vehicle is locked.

The operation of detecting and unlocking in the motor control shielded state and zero rotational speed may be triggered via a state of the kickstand. Under a condition in which the kickstand of the electric vehicle is placed down, upon the detection of the time that the electric vehicle is continuously in the unlocked and motor control shielded states and the rotational speed is zero exceeding the target time threshold, the electric vehicle is locked. When the kickstand of the electric vehicle is folded, even through the electric vehicle is in the unlocked and motor control shielded states and the rotational speed is zero, the electric vehicle is not locked. Whether the electric vehicle is folded or placed down or not may be detected via a Hall sensor on the kickstand.

For example, when the electric vehicle is in a special scene (e.g., the electric vehicle is located in an elevator), the kickstand of the electric vehicle is folded. Although the electric vehicle is in the unlocked and motor control shielded (the person leaves away from a seat chair of the electric vehicle) states and the wheel speed is zero (a wheel of the electric vehicle is not rotated), the electric vehicle is not locked.

The power supply circuit powered by the power supply of the electric vehicle for the motor may be disconnected by using the switch circuit of the electric vehicle to lock the electric vehicle. Under the condition in which the time that the electric vehicle is continuously in the unlocked and motor control shielded states and the rotational speed is zero exceeds the target time threshold, the electric control component may generate a control signal (such as low-level signal) and enables the control signal to act on the switch circuit of the electric vehicle, so as to disconnect the power supply circuit by using the switch circuit to lock the electric vehicle.

The switch circuit may include one of the following: a switch triode, a field-effect transistor and an electromagnetic relay. By providing a control signal for a base of the switch triode, a grid of the field-effect transistor or a contact pin of the electromagnetic relay, the current between a collector and an emitter of the switch triode, the current between a source and a drain of the field-effect transistor, the current between a source and a drain of the field-effect transistor or the current between a common end and a normally open end of the electromagnetic relay are controlled to disconnect the power supply circuit.

Preferably, the opening of the anti-theft alarm may also be controlled by using the electrical control component. For example, when the electric vehicle is in the unlocked and motor control shielded states, if the first predetermined information is not detected within the target time threshold, the anti-theft alarm is opened. The operation of the remote controller turns out to be unnecessary and the operation steps are simplified.

With the above technical solutions in this embodiment of the disclosure, upon the detection of the time that the electric vehicle is continuously in the unlocked and motor control shielded states, the wheel speed is zero and the kickstand is in the placed-down state exceeding the target time threshold, the electric vehicle is locked automatically; and thus, the locking process of the electric vehicle is simplified and the user experience is improved.

The method for controlling the electric vehicle will be described below in conjunction with specific examples. In this embodiment, the electric vehicle may be an electric motorcycle, an electric bicycle and an electric mopeds.

Figure 2:
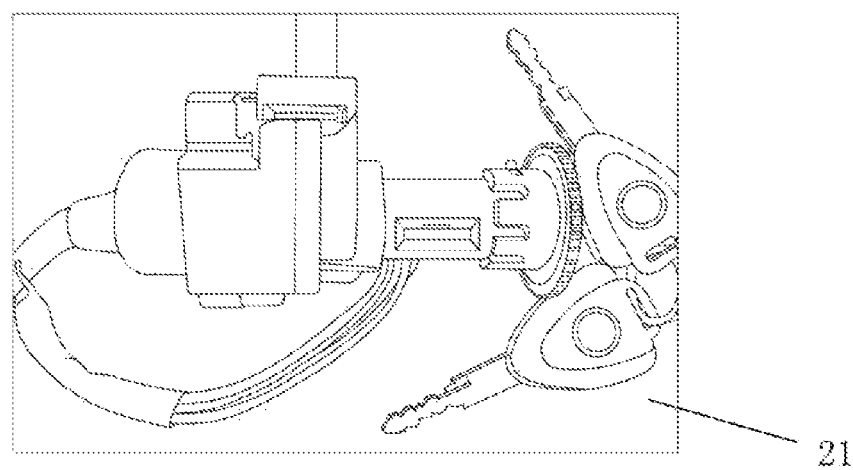
FIG. 2 is a schematic diagram of an electronic door lock module in the related art.
Figure 3:
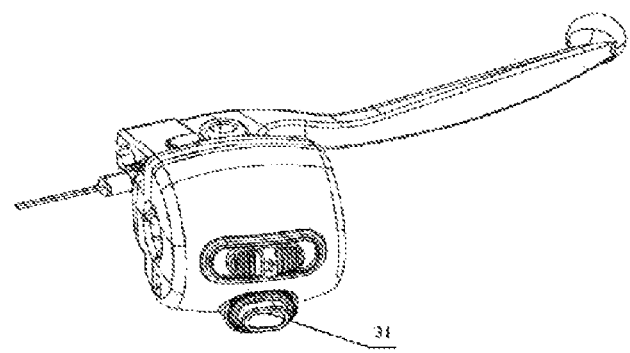
FIG. 3 is a schematic diagram of a P-gear button in the related art.
Figure 4:
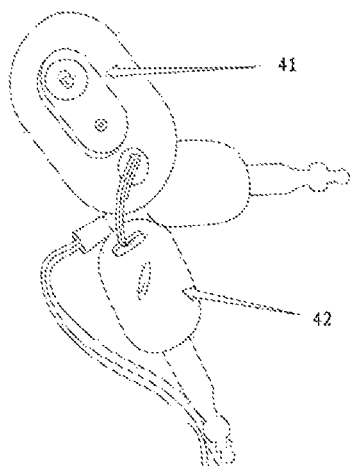
FIG. 4 is a schematic diagram of a mechanical key and a remote controller in the related art.

In the operation manner of the conventional electric vehicle, modules of many machines need to be operated artificially, such as an electronic door lock switch (like the electronic door lock switch 21 shown in FIG. 2), a P-gear button (as shown in a left-hand combined switch in FIG. 3, the vehicle is powered on, and the remote controller is in an unlocked state, and after the start switch 31 is pressed down, the lamp of the instrument P is turned off and the vehicle may drive normally), and a remote controller (as shown in FIG. 4, the rider needs to carry the remote controller 41 and the mechanical key 42 of the electronic door lock switch). As a result, the operation of the electric vehicle is troublesome and the experience is poor. Moreover, the driver (rider) needs to carry the key and the remote controller, thus being very inconvenient.

An electronic door lock switch in an electrical control system of a conventional electric vehicle is disposed at a predetermined position of the electric vehicle and a space needs to be reserved for it, so that the structural design is complex, the system is not brief sufficiently and the operation is troublesome. The function of the electronic door lock switch must be implemented by using a mechanical key. The mechanical key is not carried conveniently, so it is frequent that the mechanical key is forgotten to carry or is lost and thus the electric vehicle cannot be used.

In order to simplify the structure of the electric vehicle, in this example, the structure of the electric vehicle is simplified via a manner of integrating the electronic door lock switch and other components together.

Figure 5:
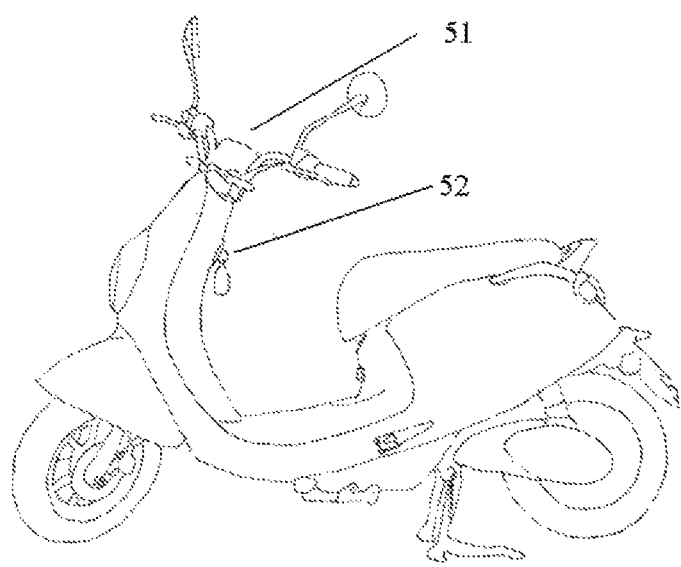
FIG. 5 is a schematic diagram of an instrument panel in the related art.

However, the electronic door lock switch in the electrical control system of the conventional electric vehicle is an individual module having a mechanical structure, is configured to control unlocking and unlocking of the vehicle, is difficult to integrate with other components (e.g., instrument) together and only can be disposed separately, as shown in FIG. 5 (the electric vehicle includes an instrument panel 51 and a mechanical switch 52).

In this example, the electronic switch is used to replace the mechanical switch (electronic door lock switch) so as to integrate with the other components.

For the electric vehicle in this example, a near electric vehicle unlocking manner (via a miniature mobile device having an NFC module such as a mobile phone, a bracelet and a card, fingerprint identification, sound identification or face identification) is adopted to replace the remote controller and key of the machine to implement the locking, unlocking, starting and closing of the vehicle. A seat cushion detection sensor technology is adopted to the P-gear button of the machine, so the activation and deactivation of the accelerator shifter as well as the automatic locking of the electric vehicle are implemented.

Figure 6:
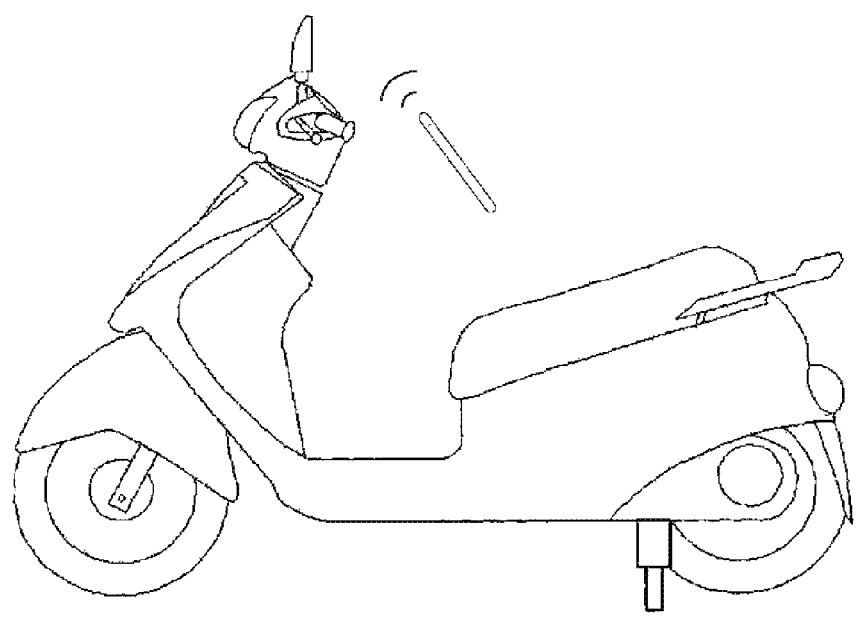
FIG. 6 is a schematic diagram of an electric vehicle according to an embodiment of the disclosure.

The electric vehicle in this example will be described below. As shown in FIG. 6, the NFC module is used to implement the function of an electronic door lock to unlock the vehicle. Since the NFC module is a pure Printed Circuit Board (PCB) chip hardware system rather than the mechanical structure, the NFC module may be integrated with the instrument together, and thus the space is saved and the operation is simplified.

As the NFC module system is adopted by the electric vehicle, the driver may implement the unlocking of the vehicle by using a carrier, such as a mobile phone, a bracelet or a card, having the NFC module without the mechanical key.

Instead of the instrument panel, the NFC module may be integrated to a side of the accelerator shifter, or saddle or seat cask, or to an interior of the combined switch, or rear view mirror or front-rear lamp.

A fingerprint unlocking module, a Bluetooth unlocking module, a face identification module, a sound identification module and the like may further be used to replace the NFC module.

Hereinafter, the process of the method for controlling the electric vehicle in this example is described. The method for controlling the electric vehicle may mainly include the following steps.

At Step 1, upon the detection that a driver is close to an electric vehicle, the electric vehicle is unlocked.

The driver is close to the electric vehicle for unlocking. The near electric vehicle unlocking may be implemented via an NFC module identification, fingerprint identification, sound identification or face identification technologies. That is, the technical solutions of the mechanical key and the remote controller are replaced with the technical solutions such as NFC module, fingerprint unlocking, Bluetooth unlocking, face identification and sound identification.

For the NFC module, the miniature mobile device having the NFC module (such as the mobile phone and the bracelet) may be employed to replace the electronic door lock switch and remote controller to implement the unlocking to the electric vehicle.

When the corresponding device and human body are close or are attached to some position of the electric vehicle (an electrical control system for identifying the NFC module or fingerprint or sound or image is mounted at this position), the electrical control system (including the electrical control component and other components powered by a power supply) of the electric vehicle identifies the corresponding signal and is then powered on automatically. Therefore, the electrical control system is started.

When the driver is close to the electric vehicle, the electric vehicle is unlocked automatically; and moreover, the anti-theft alarm may further be automatically closed. The mechanical key and the remote controller do not need to be carried, thus being convenient and quick.

At Step 2, upon the detection that the driver sits on a seat cushion, an accelerator shifter is activated automatically.

A seat cushion detection sensor may be adopted to replace the mechanical P-gear button to implement automatic control on activation and deactivation of the accelerator shifter.

Various seat cushion detection sensors may be provided, and a pressure sensor, an infrared sensor, a barometric sensor and the like are commonly seen.

The position where the detection sensor is installed as a replacement of the P-gear button may not be below the seat cushion, and the detection sensor may be installed on a pedal, or on shifters at two sides of the handlebar, or on a vehicle body portion in front of the seat cushion, or on a tire, or in the tire, or in a shock absorber, or at the above several positions, etc. The specific installation position may be set as required.

For the driver, after the driver sits on the seat cushion, the seat cushion detection sensor automatically senses a signal and automatically activates the accelerator shifter, so that the driver may normally use the accelerator shifter to ride the electric vehicle without pressing the P-gear button.

At Step 3, upon the detection that the accelerator handlebar rotates, a motor is controlled to rotate to ride normally.

After the accelerator handlebar is activated, upon the detection that the accelerator handlebar rotates, a rotational speed of the motor is controlled according to rotation, thus controlling a form speed of the electric vehicle and guaranteeing a normal form of the electric vehicle.

Concerning the driver, the driver rotates the accelerator handlebar to ride normally.

At Step 4, upon the arrival of a destination, the driver leaves the seat cushion for parking (the vehicle is locked automatically).

Upon the arrival of the destination, when the driver leaves the seat cushion for parking, the seat cushion detection sensor automatically senses a signal and the function of the accelerator handlebar is disabled automatically; and after predetermined time (such as 3-5 s), the electric vehicle is automatically locked.

After the driver leaves the seat cushion upon the arrival of the destination, the electric vehicle is locked automatically, pressing the P-gear button turns out to be unnecessary, the mechanical key corresponding to the electronic door lock switch is rotated and is pulled out, and the remote controller is pressed to start the anti-theft alarm.

With the above technical solutions in this example, as the NFC module system is adopted, the locking and automatic locking and unlocking functions of the vehicle may be implemented only with the carrier, such as the mobile phone or the bracelet or the card, having the NFC module rather than the mechanical key. The adopted NFC chip is the hardware system, so the electronic door lock system may be integrated with the instrument together, and thus the structural space is effectively saved and the cost is reduced; and the driver does not need to carry the mechanical key, so the operation experience is better.

The above are only the preferred embodiments of the disclosure and are not intended to limit the disclosure. For those skilled in the art, the disclosure may have various modifications and variations. Any modifications, equivalent replacements, improvements and the like made within the principle of the disclosure shall fall within the scope of protection of the disclosure.

What is claimed is:

1. An electric vehicle, comprising: a first power source, a target component, and an electrical control component integrated to the target component, wherein
   the first power source is connected with the electrical control component, and is configured to supply the power to the electrical control component; and
   the electrical control component is configured to unlock, under a condition in which the electric vehicle is locked, the electric vehicle when target information matched with a stored target account number is detected;
   wherein the electrical control component is further configured to unlock, under a condition in which the electric vehicle is in locked and kickstand folded state, the electric vehicle when the target information matched with the stored target account number is detected.

2. The electric vehicle as claimed in claim 1, wherein the electric vehicle further comprises: a second power source, a motor and a switch circuit, wherein
   the electrical control component is connected with the switch circuit, and is specifically configured to connect, when the target information matched with the stored target account number is detected, a power supply circuit powered by the second power source for the motor, by using the switch circuit to unlock the electric vehicle.

3. The electric vehicle as claimed in claim 2, wherein the electrical control component comprises a first wireless communication module, wherein
   the first wireless communication module is configured to receive input information sent by a second wireless communication module of a target device, wherein the input information carries account number information of a reference account number bound to the second wireless communication module; and connect, under a condition of determining that the account number information is the target information, the power supply circuit by using the switch circuit.

4. The electric vehicle as claimed in claim 3, wherein the first wireless communication module comprises at least one of the following: a Bluetooth, a Near Field Communication (NFC) module, a public Key Encryption (PKE) module, a Wireless Fidelity (wi-fi) module, a ZigBee module, an Ultra Wide Band (UWB) module and a 433M wireless ad hoc network module.

5. The electric vehicle as claimed in claim 3, wherein the target component is one of the following: an instrument panel, an accelerator shifter, a saddle, a seat cask, a combined switch, a rear view mirror, a front-rear lamp and the kickstand.

6. The electric vehicle as claimed in claim 2, wherein the electrical control component comprises a detection module and a control module, wherein
   the detection module is configured to detect biological characteristic information within a predetermined detection area; and
   the control module is connected with the detection module, and is configured to connect, under the condition of determining that the biological characteristic information is the target information, the power supply circuit by using the switch circuit.

7. The electric vehicle as claimed in claim 6, wherein the detection module comprises at least one of the following: a fingerprint detection module configured to detect a fingerprint, a face detection module configured to detect a face, and a sound detection module configured to detect a sound.

8. The electric vehicle as claimed in claim 6, wherein the target component is one of the following: an instrument panel, an accelerator shifter, a saddle, a seat cask, a combined switch, a rear view mirror, a front-rear lamp and the kickstand.

9. The electric vehicle as claimed in claim 2, wherein the switch circuit comprises a triode, and the triode comprises a base, a collector and an emitter, wherein
   the base is connected with the electrical control component, and is configured to connect the power supply circuit by adjusting a current between the collector and the emitter under the control of the electrical control component.

10. The electric vehicle as claimed in claim 9, wherein the target component is one of the following: an instrument panel, an accelerator shifter, a saddle, a seat cask, a combined switch, a rear view mirror, a front-rear lamp and the kickstand.

11. The electric vehicle as claimed in claim 2, wherein the switch circuit comprises a field-effect transistor, and the field-effect transistor comprises a source, a grid and a drain, wherein
   the grid is connected with the electrical control component, and is configured to connect the power supply circuit by adjusting a current between the source and the drain under the control of the electrical control component.

12. The electric vehicle as claimed in claim 11, wherein the target component is one of the following: an instrument panel, an accelerator shifter, a saddle, a seat cask, a combined switch, a rear view mirror, a front-rear lamp and the kickstand.

13. The electric vehicle as claimed in claim 2, wherein the switch circuit comprises an electromagnetic relay, and the electromagnetic relay comprises a trigger pin, a common end and a normally open end, wherein the trigger pin is connected with the electrical control component, and is configured to connect the power supply circuit by adjusting a current between the common end and the normally open end under the control of the electrical control component.

14. The electric vehicle as claimed in claim 13, wherein the target component is one of the following: an instrument panel, an accelerator shifter, a saddle, a seat cask, a combined switch, a rear view mirror, a front-rear lamp and the kickstand.

15. The electric vehicle as claimed in claim 2, wherein the target component is one of the following: an instrument panel, an accelerator shifter, a saddle, a seat cask, a combined switch, a rear view mirror, a front-rear lamp and the kickstand.

16. The electric vehicle as claimed in claim 1, wherein the electrical control component is further configured to lock, upon the detection of time that the electric vehicle is continuously in unlocked and motor control shielded states, a wheel speed is zero and a kickstand is in a placed-down state exceeding a target time threshold, the electric vehicle.

17. The electric vehicle as claimed in claim 16, wherein the target component is one of the following: an instrument panel, an accelerator shifter, a saddle, a seat cask, a combined switch, a rear view mirror, a front-rear lamp and the kickstand.

18. The electric vehicle as claimed in claim 1, wherein the target component is one of the following: an instrument panel, an accelerator shifter, a saddle, a seat cask, a combined switch, a rear view mirror, a front-rear lamp and the kickstand.

* * * * *